United States Patent [19]

Snoeyen

[11] Patent Number: 5,551,625
[45] Date of Patent: Sep. 3, 1996

[54] METHOD OF MANUFACTURING A MOLDING MEMBER AND MOLDING MEMBER WHICH CAN BE MANUFACTURED BY MEANS OF THE METHOD

[75] Inventor: Anthonius J. H. Snoeyen, Eindhoven, Netherlands

[73] Assignee: U.S. Philips Corporation, New York, N.Y.

[21] Appl. No.: 499,645

[22] Filed: Jul. 7, 1995

Related U.S. Application Data

[63] Continuation of Ser. No. 67,200, May 25, 1993, abandoned.

[30] Foreign Application Priority Data

Jul. 20, 1992 [EP] European Pat. Off. .............. 92202204

[51] Int. Cl.⁶ ...................................... B23K 1/19
[52] U.S. Cl. ........................... 228/174; 228/231; 228/232; 228/233.2; 148/529; 148/537
[58] Field of Search ...................... 228/132–134, 228/174, 184, 190, 221, 231, 232, 233.2, 262.42; 164/126, 348; 264/106; 148/529, 537; 425/810

[56] References Cited

U.S. PATENT DOCUMENTS

| 3,667,248 | 6/1972 | Carlson | 164/348 |
|---|---|---|---|
| 4,162,700 | 7/1979 | Kahn | 164/348 |
| 4,185,955 | 1/1980 | Holmes et al. | 264/106 |
| 4,447,381 | 5/1984 | Matey | 264/107 |
| 4,486,934 | 12/1984 | Reed | 29/445 |
| 4,768,382 | 9/1988 | Varrese | 228/184 |
| 4,883,219 | 11/1989 | Anderson et al. | 228/190 |
| 4,931,106 | 6/1990 | Tosaka et al. | 148/320 |
| 4,933,023 | 6/1990 | Wahlbeck | 148/3 |
| 4,988,035 | 1/1991 | Ueno et al. | 228/190 |
| 5,133,824 | 7/1992 | Huberts et al. | 156/344 |
| 5,234,513 | 8/1993 | Inoue et al. | 148/541 |

FOREIGN PATENT DOCUMENTS 5000385 1/1993 Japan ..................... 228/133

OTHER PUBLICATIONS

Metals Handbook Ninth Edition, vol. 6, "Induction Brazing of Steels", pp. 965–974, copyright 1983.

*Primary Examiner*—Samuel M. Heinrich
*Attorney, Agent, or Firm*—Ernestine C. Bartlett

[57] ABSTRACT

A mold (1) has two molding members (4, 6) each comprising two plates (11, 13; 15, 17) secured to one another. In the contact surface of one of the plates (13, 15) a groove (19) has been provided to form a cooling duct. In order to reduce the dimensions of such a molding member (4, 6) the two plates (11, 13; 15, 17) are secured to one another by means of a soldering process. In comparison with the known method of securing the plates of a molding member to one another by means of bolts this method has the advantage that no screwthread has to be provided in the plates and no additional sealing, for example by means of an O-ring, has to be provided between the plates in order to seal the cooling duct. As a result of this, the plates can be thinner so that the molding members (4, 6) and the mold (1) can be smaller.

9 Claims, 2 Drawing Sheets

METHOD OF MANUFACTURING A MOLDING MEMBER AND MOLDING MEMBER WHICH CAN BE MANUFACTURED BY MEANS OF THE METHOD

This is a continuation of application Ser. No. 08/067,200, filed May 25, 1993, now abandoned.

FIELD OF THE INVENTION

The invention relates to a method of manufacturing a molding member comprising two at least substantially flat plates secured one to the other via contact surfaces which contact one another at least one of the plates having a groove in the contact surface, which groove forms a cooling duct. Such a method is used inter alia in injection-molding apparatus for the manufacture of optical information carriers such as, for example, Compact Discs.

BACKGROUND OF THE INVENTION

A molding member of the type defined in the opening sentence is known from U.S. Pat. No. 4,185,955. Said document describes a mold having two mold sections which, if the mold sections are in contact with one another, bound a disc-shaped cavity for molding an optical disc. Each mold section has a molding member comprising two plates, grooves being provided in the contact surface of one of the plates to form cooling ducts for rapidly cooling the injection-molded product and the molding members after the injection-molding process. The plates of a molding member are secured to one another by means of bolts. To seal the cooling ducts O-rings are provided in grooves formed especially for this purpose in one of the plates. This method of joining the plates requires much space. The plates should have an adequate thickness to allow them to be provided with the required screwthread. The bolted joints are situated near the edges of the plates at some distance from the cooling ducts because the space available between the cooling ducts is not adequate and because seals in the form of O-rings have to be inserted between the cooling ducts and the bolted joints. In order to prevent the plates from being warped because of the liquid pressure in the cooling ducts, as a result of which the wall of the cavity in which the product is molded would no longer have the required flatness, the plates should have a specific thickness (rigidity). Because of these requirements the molding member is large, which also results in large dimensions of a mold, cooling ducts, liquid pumps, hydraulic cylinders for moving the molding member, and other parts of an injection-molding apparatus in which the mold with the molding members is used.

SUMMARY OF THE INVENTION

An object of the invention is to provide a method of manufacturing a molding member which, for molding the same product, can be smaller than the prior-art molding member, so that the mold and the injection-molding apparatus using the mold can also be of compact construction. To this end the method in accordance with the invention is characterized in that the plates are secured to one another by soldering. The soldered joint thus obtained also provides an effective sealing of the cooling ducts, so that no O-rings are required, which saves space. Since the plates are secured to one another over a large area and the joint extends up to the cooling ducts, the molding member has a higher rigidity so that it is possible to use plates which are thinner than in the prior-art molding member. Since the plates are thinner the cooling ducts can also be smaller because the volume to be cooled is smaller. As a result of this, the mold, the liquid pumps, hydraulic cylinders for moving the mold, and other parts of an injection-molding apparatus in which the mold with the molding members is used can be of compact construction.

An embodiment of the method in accordance with the invention is characterized in that before the plates are secured to one another the plates are subjected to stress-relief annealing, after which solder is introduced between the contact surfaces, upon which the plates are pressed against one another with their contact surfaces facing each other and the plates and the solder are heated and subsequently cooled. By first stress-relief annealing the plates the plates do not warp during heating and cooling, so that an excellent joint is obtained.

A further embodiment of the method in accordance with the invention is characterized in that during soldering the plates are also hardened. In order to meet the requirements imposed on the plates of the mold the plates must be hardened. When hardening and soldering are effected in one operation, time is saved and the plates need not be subjected to any intermediate operations after hardening and before soldering.

Yet another embodiment of the method in accordance with the invention is characterized in that cooling is effected by first cooling the plates to a first temperature in a vacuum furnace and then cooling the plates to a second temperature in air. During cooling to the first temperature the solder solidifies and no reactions with gases are allowed. Therefore, the first cooling cycle is performed in a vacuum furnace. Subsequently, the plates are cooled further, which causes a change of structure which hardens the plates.

Still another embodiment of the method in accordance with the invention is characterized in that the contact surfaces of the plates are electroplated before the plates are secured to one another. A suitable electroplating method is nickel-plating of the contact surfaces. Electroplating of the contact surfaces before soldering yields a proper joint, which precludes embrittling of the plates.

The invention also relates to a molding member which can be manufactured by means of the method in accordance with the invention, said member comprising two at least substantially flat plates which are secured to one another and which each contact one another with a contact surface, at least one of the plates having a groove in the contact surface, which groove, forms a cooling duct. The molding member in accordance with the invention is characterized in that the plates are secured to one another by means of a soldered joint.

During cooling the temperature at the plate surface bounding the cavity for molding the optical disc should be substantially uniform over the entire area. If the temperature at the surface is not uniform some parts of the optical disc will cool more rapidly than other parts, which may give rise to color differences in the disc. In order to obtain a uniform temperature at the surface of the plate the thickness of the plate between this surface and the cooling ducts must have a minimal thickness. Otherwise the surface near a cooling duct will have a lower temperature than a surface remoter from a cooling duct. In order to minimize this thickness of the plate the molding member in accordance with the invention is characterized in that a wall of the cooling duct is provided with projections and/or a wall of the cooling duct is provided with recesses. In operation this gives rise to a turbulent liquid flow in the cooling ducts, which provides a better cooling than in the case of a laminar liquid flow and the temperature equalizes sooner than in the case of a laminar liquid flow, so that the thickness of the plate can be reduced.

BRIEF DESCRIPTION OF THE DRAWINGS

The invention will now be described in more detail, by way of example, with reference to the drawings. In the drawings.

DETAILED DESCRIPTION OF THE PREFERRED EMBODIMENTS

Figure 1:
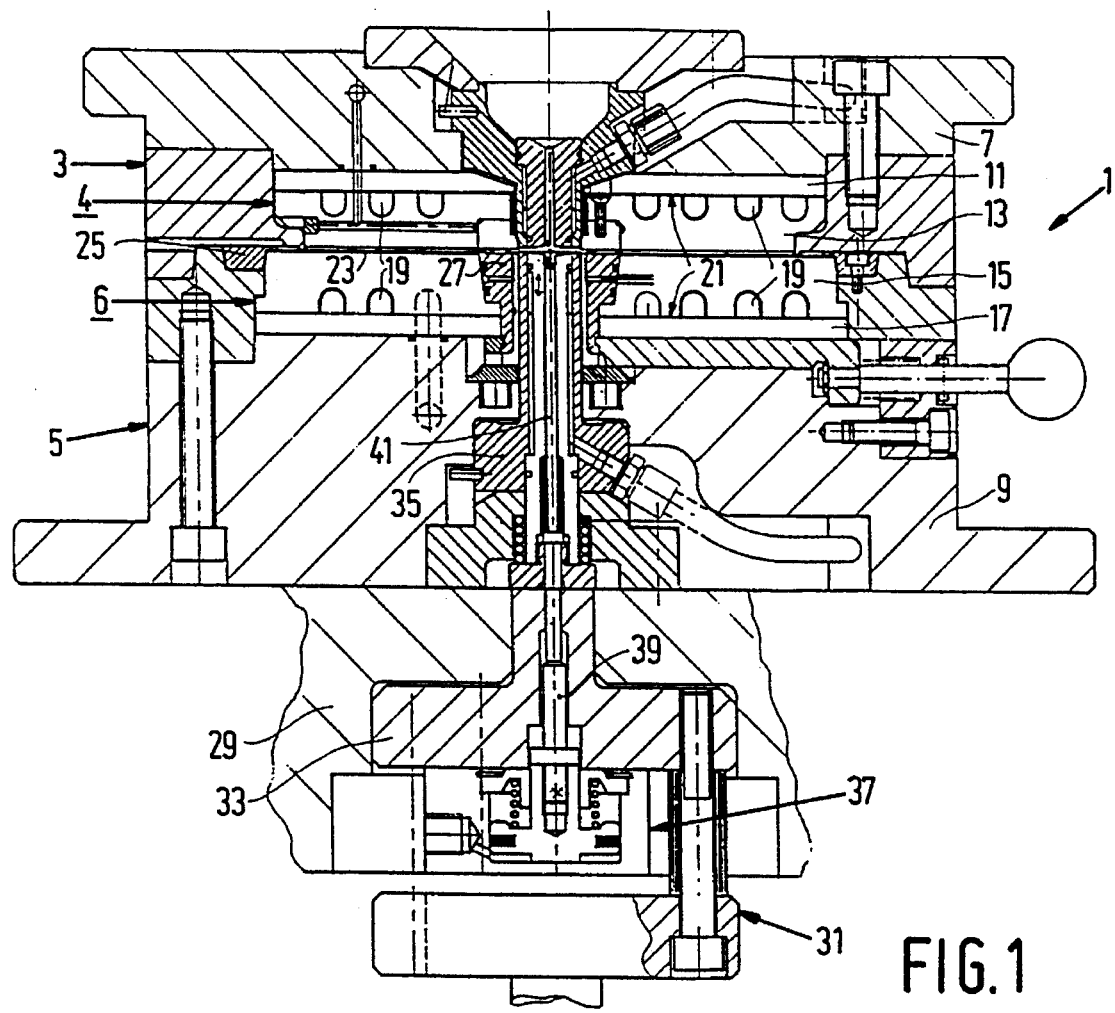
FIG. 1 is a sectional view of a mold comprising molding members in accordance with the invention.

FIG. 1 shows a mold 1 comprising a first and a second mold section 3, 5. The mold sections each comprise a rear part 7, 9 carrying a first molding member 4 and a second molding member 6 respectively. Each molding member 4, 6 comprises two plates 11, 13, 15, 17 secured to one another. One of the plates has a groove 19, which after the two plates have been secured to one another, forms a cooling duct for cooling the product to be molded. The plates 11, 13, 15, 17 are secured to one another by means of a soldered joint 21. In comparison with the customary fixing method by means of bolts, using an O-ring for sealing the cooling duct, this soldered joint has the advantage that it also provides sealing of the cooling ducts and that the plates to be interconnected can be thinner because no material for screwthread has to be provided. The plate 15 of the second molding member 6 carries a shell 23, which is clamped in position by means of a clamping ring 25 and a clamping bush 27. This shell 23 has a profile representing information. This profile is formed in the product during molding of a product. The plate 13 of the first molding member 4 facing the shell has a smooth surface because the product is provided with information at one side only.

The second mold section 5 is carried by a base 29 of an injection-molding apparatus. This base 29 comprises a first mechanism 31 for effecting a punch movement. This mechanism 31 comprises a movable piston 33. This punch movement is followed by a punch 35 provided in the second mold section 5 in order to sever a sprue slug from the product. The base 29 further comprises a second mechanism 37 for effecting an ejection movement. This second mechanism 37 comprises a further piston 39, which can be moved hydraulically or pneumatically. This further piston 39 is situated in the first-mentioned piston 33. Said ejection movement is followed by an ejector 41 provided in the second mold section 5 in order to eject a sprue slug from the punch 35.

Figure 2:
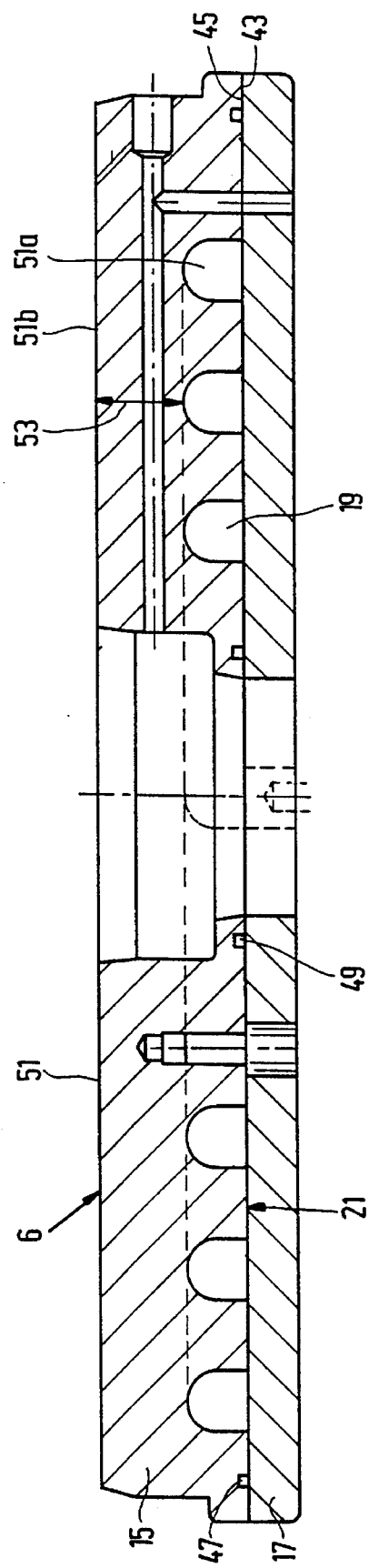
FIG. 2 is a sectional view of two interconnected plates of a molding member.

FIG. 2 shows the two plates 15, 17 of the second molding member 6. The plates should be made of an air-hardening die steel in order to enable the plates to be hardened during soldering. A suitable material is for example X40Cr13. Before the plates are hardened and secured to one another they are first subjected to stress-relief annealing in order to remove internal stresses in the plates. During heating in the hardening and soldering process such internal stresses could give rise to warping of the plates. Subsequently, the plates are pre-treated, inter alia planed. This is because the plates may be slightly warped during stress-relief annealing. For soldering stringent requirements are imposed on the flatness of the plate surfaces to be joined. Before the plates are soldered to one another the contact surfaces 43 and 45 to be secured to one another are electroplated. This provides an improved solder joint and the plates become less brittle near the contact surfaces upon soldering. A suitable electroplating method is nickel-plating. After this the solder is applied, a soldering wire being inserted into grooves 47, 49 provided for this purpose in the plate 15 and a soldering foil being interposed between the contact surfaces 43 and 45. The solder material should be selected in such a manner that the solder is liquid at the temperature required for hardening the plates. For the soldering wire it is possible to select, for example, a copper alloy, nickel alloy or silver alloy. A suitable copper alloy is for example CuSn6. The soldering foil may be, for example, a bronze foil cut to size. Soldering is effected in a vacuum furnace at a temperature of approximately 1050° C. During soldering the plates are clamped against one another by a clamping device. During soldering the plates are also hardened. For the purpose of hardening, the plates are cooled in a controlled manner. This is effected by first cooling the plates in a vacuum furnace to a first temperature of approximately 880° C. at which the solder solidifies and under such conditions, no reactions with ambient gases are allowed. Subsequently, the plates are further cooled in air to a second temperature of approximately 50° C., which gives rise to a change of structure whereby the plates are hardened. The final structure of the plates is the martensite structure. Cooling in air is followed by tempering, the molding member being maintained at 520° C. for approximately one hour.

Figure 3:
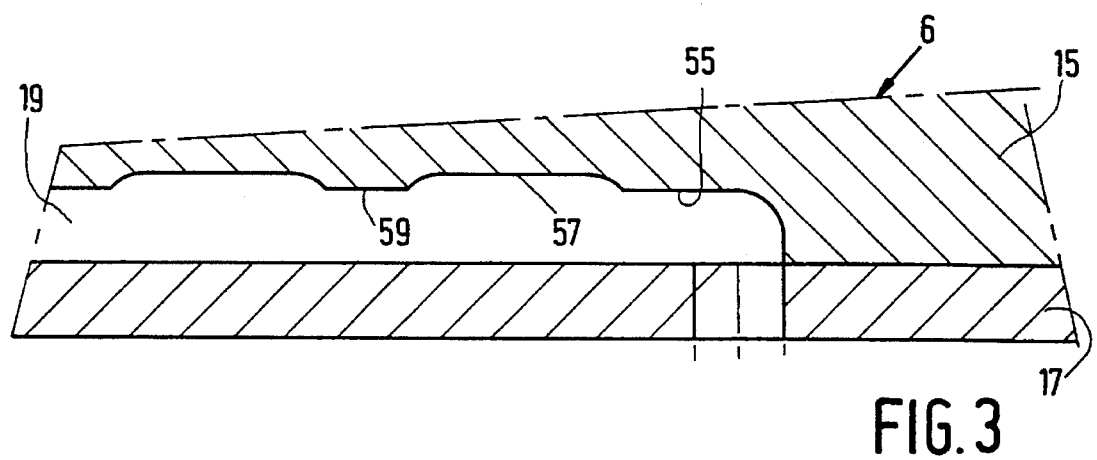
FIG. 3 is a longitudinal sectional view of a cooling duct formed in a molding member.

During cooling of the optical disc the temperature at the surface 51 of the plate 15, which surface bounds the cavity for molding the optical disc, should be substantially uniform over the entire area. If the temperature at the surface is not uniform some pans of the optical disc will cool more rapidly than other parts, which may give rise to color differences in the disc. These color differences render the optical disc useless because of the influence on the reflection of a light beam. In order to obtain a uniform temperature at the surface 51 of the plate 15 the distance 53 between this surface 51 and the cooling ducts 19 must have a minimal value. If the plate 15 is too thin a part 51a of the surface 51 near a cooling duct 19 will have a lower temperature than a part 51b of the surface 51 which is remoter from a cooling duct 19. In order to minimize this distance 53 and hence the thickness of the plate, a wall 55 of the cooling duct 19 is provided with recesses 57, see FIG. 3. Conversely, the wall 55 of the cooling duct 19 may be regarded as a wall provided with projections 59 instead of a wall provided with recesses. In operation these recesses 57 give rise to a turbulent liquid flow in the cooling ducts 19, which provides a better cooling than in the case of a laminar liquid flow and the temperature equalizes sooner than in the case of a laminar liquid flow, so that the plate can be thinner.

It is to be noted that the plates 11 and 13 of the first molding member 4 may also be secured to one another by the method described above.

Although the invention has been described with reference to the drawings this does not imply that the invention is limited to the embodiment shown in the drawings. The invention likewise relates to all embodiments which deviate from those shown in the drawings within the scope defined by the claims.

I claim:

1. A method of manufacturing a molding member comprising two at least substantially flat plates which are secured to one another via a contact surface present on each plate, at least one of the plates having a groove which forms a cooling duct in the contact surface, said method comprising the steps of:

(1) stress-relief annealing of the plates;
   (2) electroplating the contact surfaces;
   (3) introducing a solder between the contact surfaces while the same are in facing relationship;
   (4) pressing the plates against one another while maintaining said contact surfaces in facing relationship;
   (5) heating the plates and the solder to liquefy the solder; and
   (6) cooling the plates to solidify the solder and secure the plates one to another at said contact surfaces.

2. A method as claimed in claim 1, wherein after electroplating a solder wire is inserted into at least one solder groove provided in the surface of at least one plate and a solder foil is interposed between the contact surfaces.

3. A method as claimed in claim 1 wherein the plates are also hardened during the soldering process.

4. A method as claimed in claim 1 wherein cooling is effected by first cooling the plates to a first temperature in a vacuum furnace and then cooling the plates to a second temperature in air.

5. A method as claimed in claim 1 wherein the contact surfaces of the plates are electroplated before the contact surfaces of the plates are secured to one another and hardened during the soldering process.

6. A method as claimed in claim 5, wherein electroplating is effected by nickel-plating the contact surfaces.

7. A method of manufacturing a molding member comprising two at least substantially flat plates which are secured to one another by a soldered joint, at least one of the plates having a groove which forms a cooling duct in a surface portion of the plate, said soldered joint extending up to the cooling duct, said method comprising the step of:

(1) stress-relief annealing of the plates;
   (2) electroplating the contact surfaces;
   (3) introducing a solder between the contact surfaces while the same are in facing relationship;
   (4) pressing the plates against one another while maintaining said contact surfaces in facing relationship;
   (5) heating the plates and the solder to liquefy the solder; and
   (6) cooling the plates to solidify the solder and secure the plates one to another at said contact surfaces.

8. A method as claimed in claim 7 in which said plates are formed of an air-hardening die steel and said soldered joint is formed at a temperature of about 1050° C., after which the plates are cooled in a vacuum furnace to a temperature of about 880° C. at which temperature the solder solidifies, after which the plates are further cooled in air to a temperature of about 50° C., whereby the plates are hardened.

9. A method as claimed in claim 7, wherein after electroplating a solder wire is inserted into at least one solder groove provided in the surface of at least one plate and a solder foil is interposed between the contact surfaces.

* * * * *